United States Patent [19]
Davis et al.

[11] Patent Number: 5,270,494
[45] Date of Patent: Dec. 14, 1993

[54] SELF-CONTAINED WEIGHING SYSTEM AND METHOD

[75] Inventors: Dick E. Davis, Arlington, Tex.; Charles R. Brazell, San Francisco, Calif.; James W. Manley, Arlington, Tex.

[73] Assignee: General Electrodynamics Corporation, Arlington, Tex.

[21] Appl. No.: 851,759

[22] Filed: Mar. 16, 1992

Related U.S. Application Data

[62] Division of Ser. No. 457,488, Dec. 28, 1989, Pat. No. 5,131,482.

[51] Int. Cl.⁵ .................... G01G 19/40; G01G 19/52
[52] U.S. Cl. .................................. 177/25.14; 177/50
[58] Field of Search ........................... 177/50, 25.14

[56] References Cited
U.S. PATENT DOCUMENTS
4,919,222 4/1990 Kyrtsos et al. .................. 177/139

Primary Examiner—George H. Miller, Jr.
Attorney, Agent, or Firm—Baker & Botts

[57] ABSTRACT

A self-contained stand-alone weighing system (10) comprises at least one weight supporting surface (24) for bearing the weight of an object, at least one transducer (60) coupled to the weight supporting surface (24) for producing a signal indicative of the weight, and a processor (66) for receiving the signal and producing a resultant weight signal. The resultant weight signal is then represented in a form perceptible to humans by a weight indicator (38). The self-contained weighing system (10) also comprises a rechargeable battery (36) for supplying electrical energy, and a housing (12,14) for enclosing the weighing system (10) to form a single unit.

3 Claims, 7 Drawing Sheets

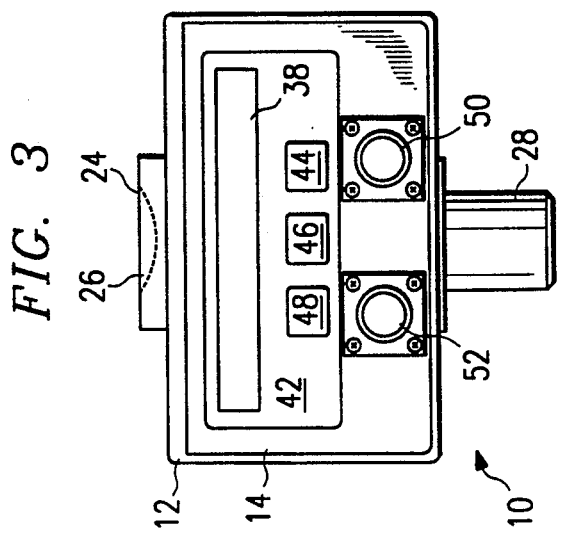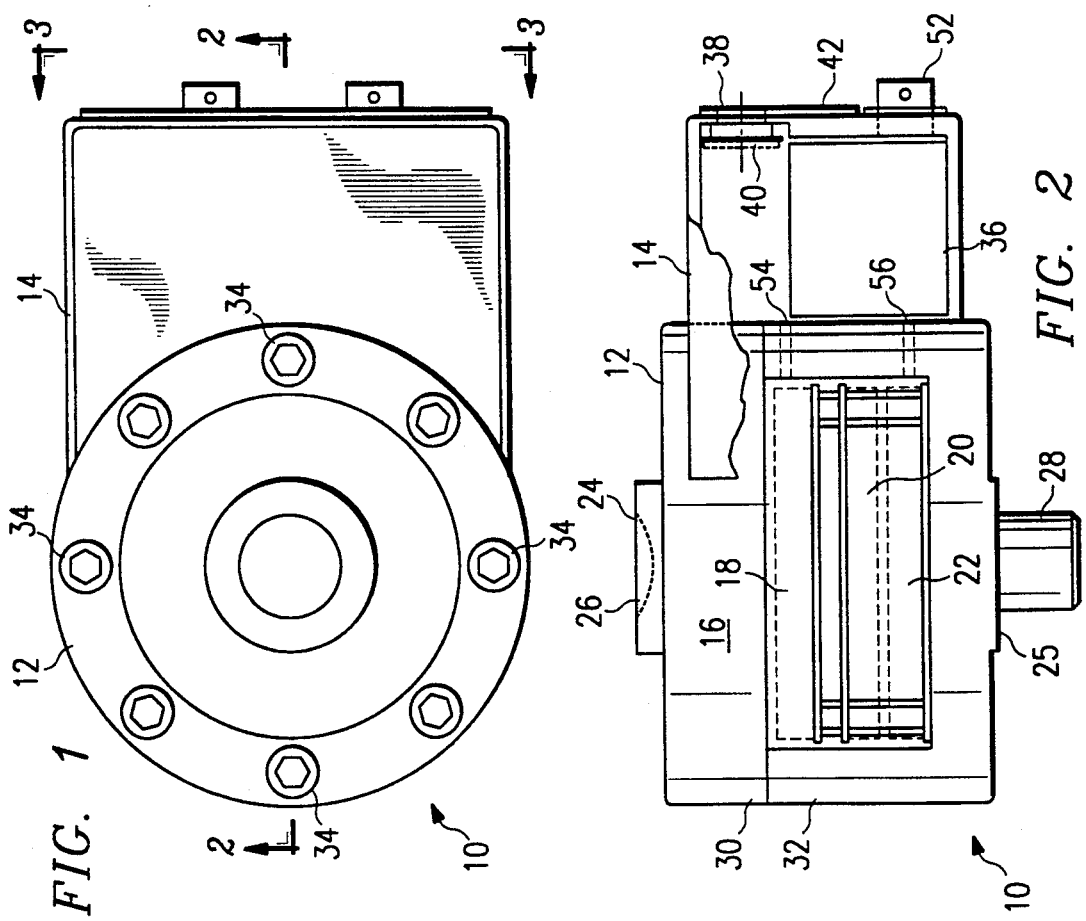

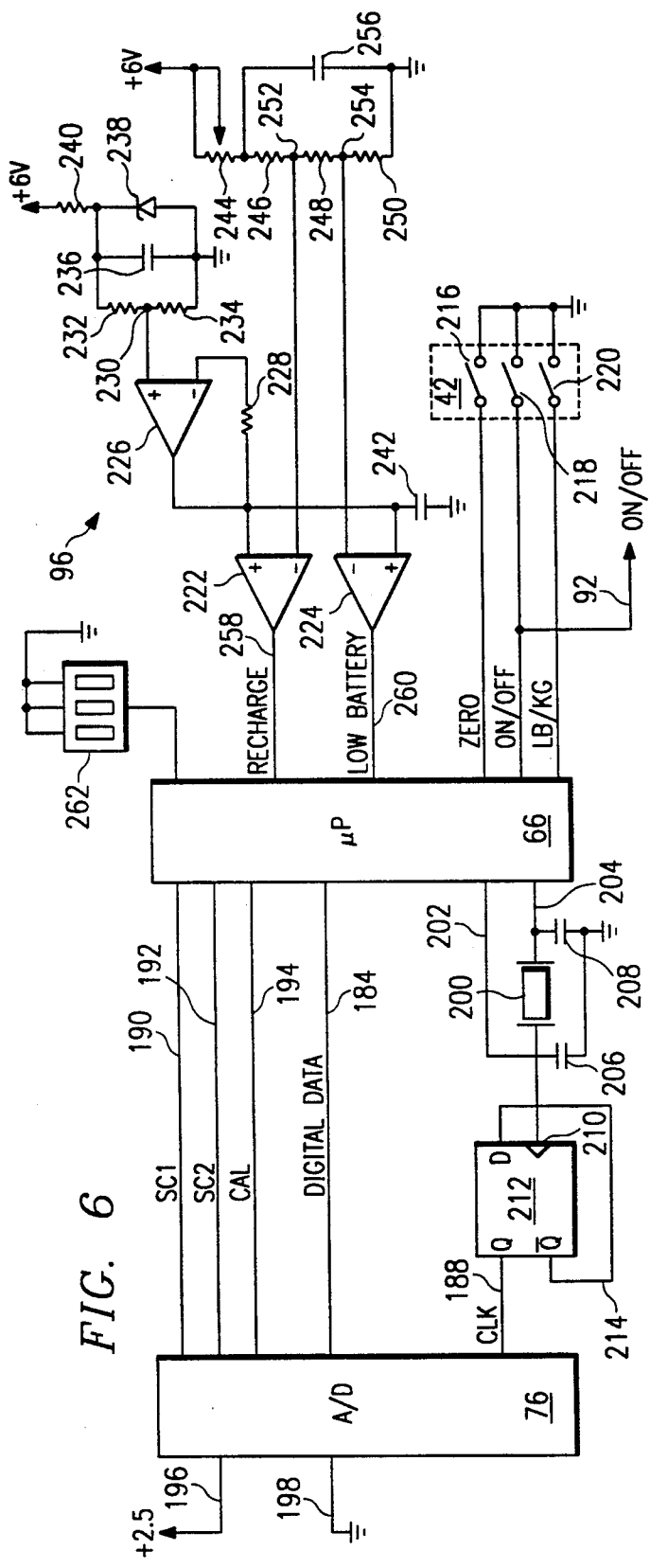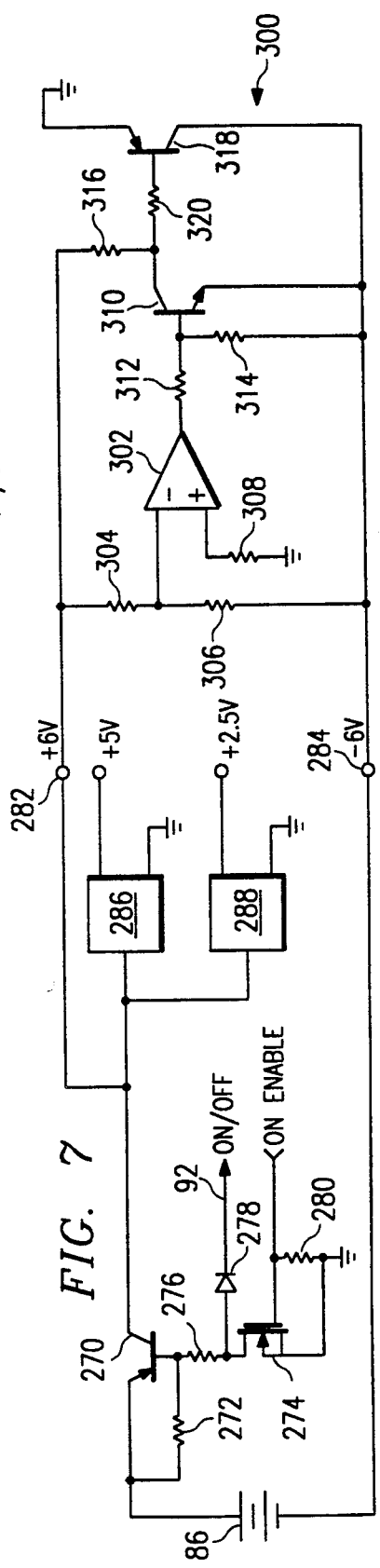
FIG. 6
FIG. 7

SELF-CONTAINED WEIGHING SYSTEM AND METHOD

RELATED APPLICATIONS

This application is a divisional of U.S. patent application Ser. No. 07/457,488, filed Dec. 28, 1989 and entitled "Self-Contained Weighing System and Method", now U.S. Pat. No. 5,131,482, issued Jul. 21, 1992.

TECHNICAL FIELD OF THE INVENTION

This invention relates generally to the field of weight measurement systems, and more particularly to a self-contained weighing system and method.

BACKGROUND OF THE INVENTION

Many weighing devices are available today for measuring the weight of large and/or heavy objects such as aircraft and trucks. Typically, these weighing devices include at least one load cell tethered to a computing unit via a cable. The cable supplies electricity to the load cell, and transmits weight data from the load cell to the computing unit, where the data may be processed.

In most aircraft and heavy vehicle weight measurement applications, a plurality of load cells are required to support and measure the weight. The weight data from the load cells are then transmitted over respective cables to the computing unit and collectively processed to generate a total weight of the object. Because of the large size of the object, it is not uncommon to use cables of considerable length for the coupling between the load cells and the computing unit. There are certain undesirable side effects associated with the use of long cables for transmitting data. First, the weight data, while being transmitted over the cables, are more susceptible to corruption due to electromagnetic noise. Therefore, the longer the cable, the more exposure to the noisy environment. Second, it is inconvenient to set up the load cells, route the individual cables around obstacles to reach the load cells, plug the cables one by one into the load cells, and plug the other ends of the cables into the computing unit.

Accordingly, it is advantageous to eliminate the cables and the external computing unit by making each load cell self-contained. The self-contained weighing system is placed at each weigh point of the object, determines the weight and provides a display of the measured weight at the point of measurement.

The present invention provides for a self-contained weighing system and is directed to overcoming one or more of the problems as set forth above.

SUMMARY OF THE INVENTION

In accordance with the present invention, a self-contained weighing system is provided which substantially eliminates or reduces disadvantages and problems associated with prior weighing devices.

In one aspect of the present invention, a self-contained stand-alone weighing system comprises at least one weight supporting surface for bearing the weight of an object, at least one transducer coupled to the weight supporting surface for producing a signal indicative of the weight, and a processor for receiving the signal and producing a resultant weight signal. The resultant weight signal is then represented in a form perceptible to humans by a weight indicator. The self-contained weighing system also comprises a rechargeable battery for supplying electrical energy and a housing for enclosing the weighing system to form a single unit.

In another aspect of the present invention, a method for determining weight measured by weighing apparatus is provided. During manufacture of the weighing apparatus and prior to use, an object of known weight is weighed by the apparatus, a weight signal correlative to the weight of the object is produced, and both the weight and the weight signals are stored. The steps are repeated with objects of differing known weights, then a least square polynomial is fit to the stored weights and corresponding weight signals are computed to produce at least one polynomial coefficient. The coefficient is stored. During use of the weighing apparatus, an object of unknown weight is weighed and a weight signal correlative to the weight of the object is produced. The weight is computed by solving the polynomial using the stored coefficient.

An important technical advantage of the present invention includes providing a weighing system that is self-contained and does not require cables to connect it to a computing unit.

BRIEF DESCRIPTION OF THE DRAWINGS

For a better understanding of the present invention, references may be made to the accompanying drawing, in which:

FIG. 1 is a top view of a preferred embodiment of a self-contained weighing system;

FIG. 2 is a side view of the preferred embodiment of the self-contained weighing system taken along line 2—2;

FIG. 3 is another side view of the preferred embodiment of the self-contained weighing system taken along line 3—3;

FIG. 6 is a schematic diagram of the preferred embodiment of a digital circuitry portion of the self-contained weighing system;

FIG. 7 is a schematic diagram of the preferred embodiment of a circuit which generates battery status signals, a power supply circuitry and a virtual ground circuit of the self-contained weighing system;

DETAILED DESCRIPTION OF THE INVENTION

Figure 4:
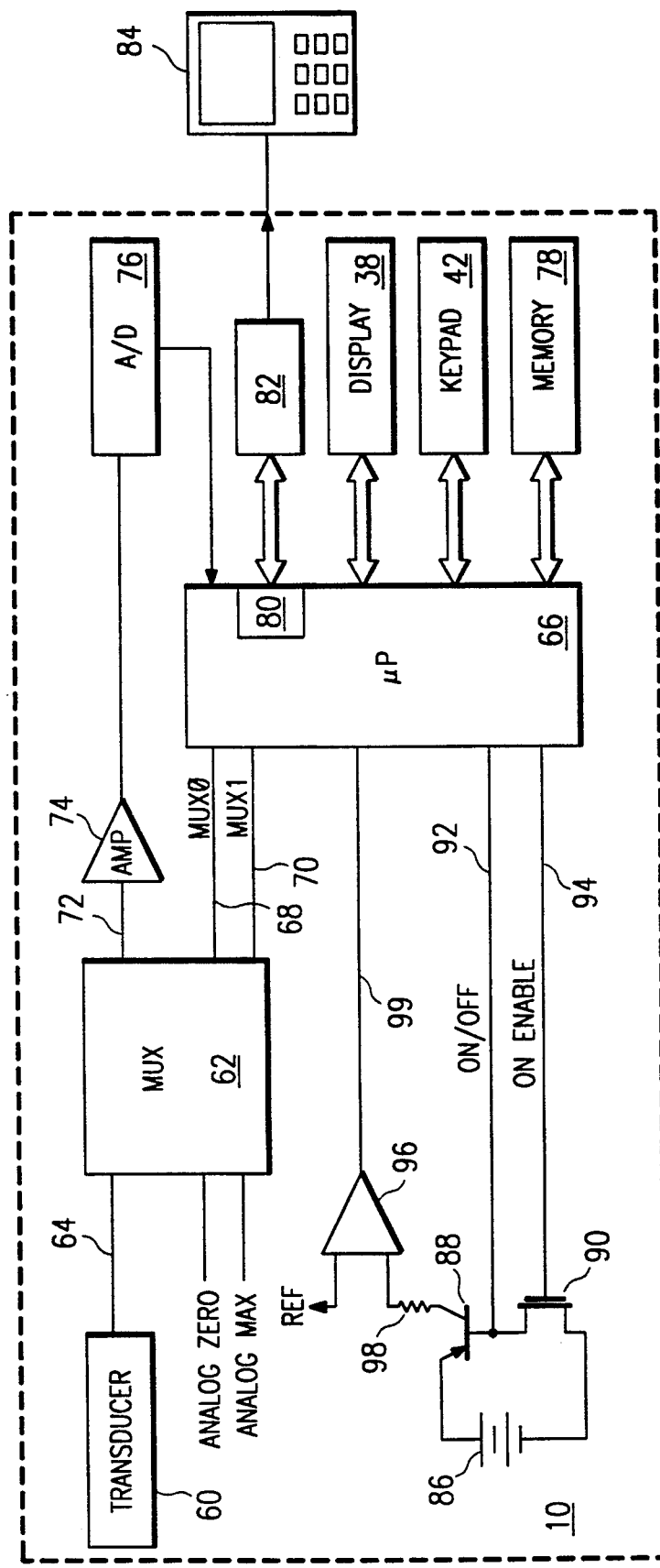
FIG. 4 is a block diagram of the preferred embodiment of the circuitry in the self-contained weighing system and a portable terminal.

With reference to the drawing, FIGS. 1, 2 and 3 are views of an embodiment of the self-contained weighing system, indicated generally at 10 and constructed according to the teaching of the present invention. FIG. 1 shows a top view of weighing system 10, while FIGS. 2 and 3 are side views of system 10 taken along lines 2—2 and 3—3, respectively.

Self-contained weighing system 10 is enclosed in a housing having generally two portions 12 and 14. Housing portion 12 houses a load cell 16 and printed circuit (PC) boards 18, 20 and 22 containing digital circuitry, analog circuitry and a power supply, respectively. Additionally, precaution is taken for overheating, electromagnetic and radio frequency noise using heat sinks, heat spreaders, and shielding devices, which are not shown in the drawing.

The load cell 16 includes a top force supporting surface 24 which extends beyond the top surface of load cell 16 and a bottom force supporting surface 25 which extends beyond the bottom surface of load cell 16. Surface 24 includes a concavity 26 for receiving a protruding element of an aircraft or vehicle (not shown) designed and constructed for this purpose. The concavity 26 is generally spherical. A locating pin 28 is mounted to housing portion 12 directly opposing concavity 26 and is insertable into a hydraulic lift jack (not shown), which may be used to elevate the weighing system and the object supported thereon. Self-contained weighing system 10 may be constructed with load cells of varying weight capacities, anywhere from, for example, five thousand pounds to two hundred thousand pounds. Preferably, load cell 16 is manufactured by General Electrodynamics Corporation of Arlington, Texas. A transducer is coupled to weight supporting surface 24 and detects the change in resistance in the material due to stress caused by force on surface 24. Housing portion 12 further includes a top portion 30 and a bottom portion 32; the two portions are held firmly together with fasteners 34, such as bolts.

Housing portion 14 is coupled to housing portion 12 and encloses the rest of the components of self-contained weighing system 10, including a rechargeable battery 36, a 16×1 alphanumeric liquid crystal display (LCD) 38, and an LCD driver PC board 40. LCD 38, such as one manufactured by Densitron, displays the weight of the object being weighed and the unit of measurement, as well as system status messages, such as low battery and recharge battery. Additionally, LCD 38 may display error messages in association with the operation of system 10. LCD 38 may be mounted in a tiltable assembly (not shown) so that the angle of viewing may be varied. A keyboard 42 is mounted on housing portion 14 and contains three depressible keys 44, 46 and 48. The keys 44, 46 and 48 are associated with specific functions such as zero, power on/off, and unit of measurement, respectively. Also mounted on the housing portion 14 are two receptacles 50 and 52 for recharging battery 36 and for connecting a portable terminal (shown in FIG. 4) to weighing system 10, respectively. The function of the portable terminal will be discussed in detail below. It is to be noted that the positions of LCD 38, keyboard 42 and receptacles 50 and 52 on housing portion 14 may differ from those shown in FIG. 1-3 without departing from the teachings of the present invention. To allow cables to pass between housing portions 12 and 14, two through holes 54 and 56 are drilled in the wall adjoining the two portions.

Self-contained weighing system 10 may also be used in crane weighing and lifting application. In such applications, system 10 would include coupling members such as threaded assemblies in place of surface 24, concavity 26 and locating pin 28. Constructed in this fashion, system 10 may be coupled between the crane and a load to measure the load weight. An annunciator (not shown) for overload alarm may be coupled to system 10 to sound an audible alarm. The annunciator may be coupled to system 10 through receptacle 52.

In another embodiment of the present invention, a plurality of self-contained weighing system 10 may be coupled to a platform to form a weighing scale. Each self-contained weighing system 10 may be connected to a central display and/or computing unit (not shown) through receptacle 52 for a collective display of weights measured.

Referring to FIG. 4, which provides an overview of the circuitry in system 10, the differential output of a transducer 60 is coupled to one input of a four-to-one differential analog multiplexer (MUX) 62 via lines 64. Transducer 60 produces differential load signals having amplitudes proportional to the weight of the object being measured. Preferably, transducer 60 is of an electrical bridge type strain gage. Analog MUX 62 receives two other differential inputs: ANALOG ZERO and ANALOG MAX, which are voltage levels used during autocalibration to be discussed below. Analog MUX 62 is further coupled to a microprocessor 66, preferably SC80C451 manufactured by Signetics Corporation, via lines 68 and 70. Analog MUX 62 selects one of the three differential signals on its inputs, and outputs the selected signal on an output 72 depending on the state of control signals on lines 68 and 70. Output 72 of analog MUX 62 is connected to circuit components in an amplifier section 74, the details of which will be discussed below in conjunction with FIG. 5.

The output of amplifier section 74 is coupled to an analog to digital (A/D) converter 76, which converts the analog signal received at its input to a digital signal at its output. Preferably, A/D converter 76 is model CS5501 or CS5503 manufactured by Crystal Semiconductor Corporation of Austin, Texas. The output of A/D converter 76 is connected to microprocessor 66. A memory 78, including a ROM (read-only memory), a RAM (random access memory) and an EEPROM (electrically erasable and programmable read-only memory), is coupled to microprocessor 66 for storage. Microprocessor 66 also has internal RAM (not shown). In addition, microprocessor 66 may possess features common to most microprocessor devices, such as input/output (I/0) ports, registers, buffers, an arithmetic logic unit (ALU) and the like. An internal UART (universal asynchronous receiver and transmitter) 80 in microprocessor 66 is coupled to an RS232C level shifter 82, which may be coupled to a portable terminal 84 through receptacle 52 (shown in FIG. 3). Portable terminal 84 is used during a calibration step as part of the manufacturing process, and may or may not include real computing capability. Portable terminal 84 includes a display screen and a plurality of keys. Microprocessor 66 is further coupled to display 38 and keyboard 42, both shown in FIG. 3, to provide an interface to a human operator.

A battery 86 supplies 12 volts of electrical power to self-contained weighing system 10. The positive node of battery 86 is coupled to an emitter of a transistor 88. A base of transistor 88 is connected to a drain of a metal oxide semiconductor field effect transistor (MOSFET) 90. The base of transistor 88 is also connected to an input port of microprocessor 66 via line 92, on which a signal ON/OFF is delivered from the base of transistor 88 to microprocessor 66. MOSFET 90 is controlled by an ON ENABLE signal on line 94 generated by microprocessor 66. One input of a comparator 96 is coupled to a collector of transistor 88 through a resistor 98. Comparator 96 compares the voltage level of battery 86 with a reference voltage source REF coupled to another input of comparator 96, and produces at least one battery status signal on line 99. Line 99 is connected to an input port of microprocessor 66. The details of this battery status signal producing section will be discussed in connection with FIG. 7 below.

Figure 5:
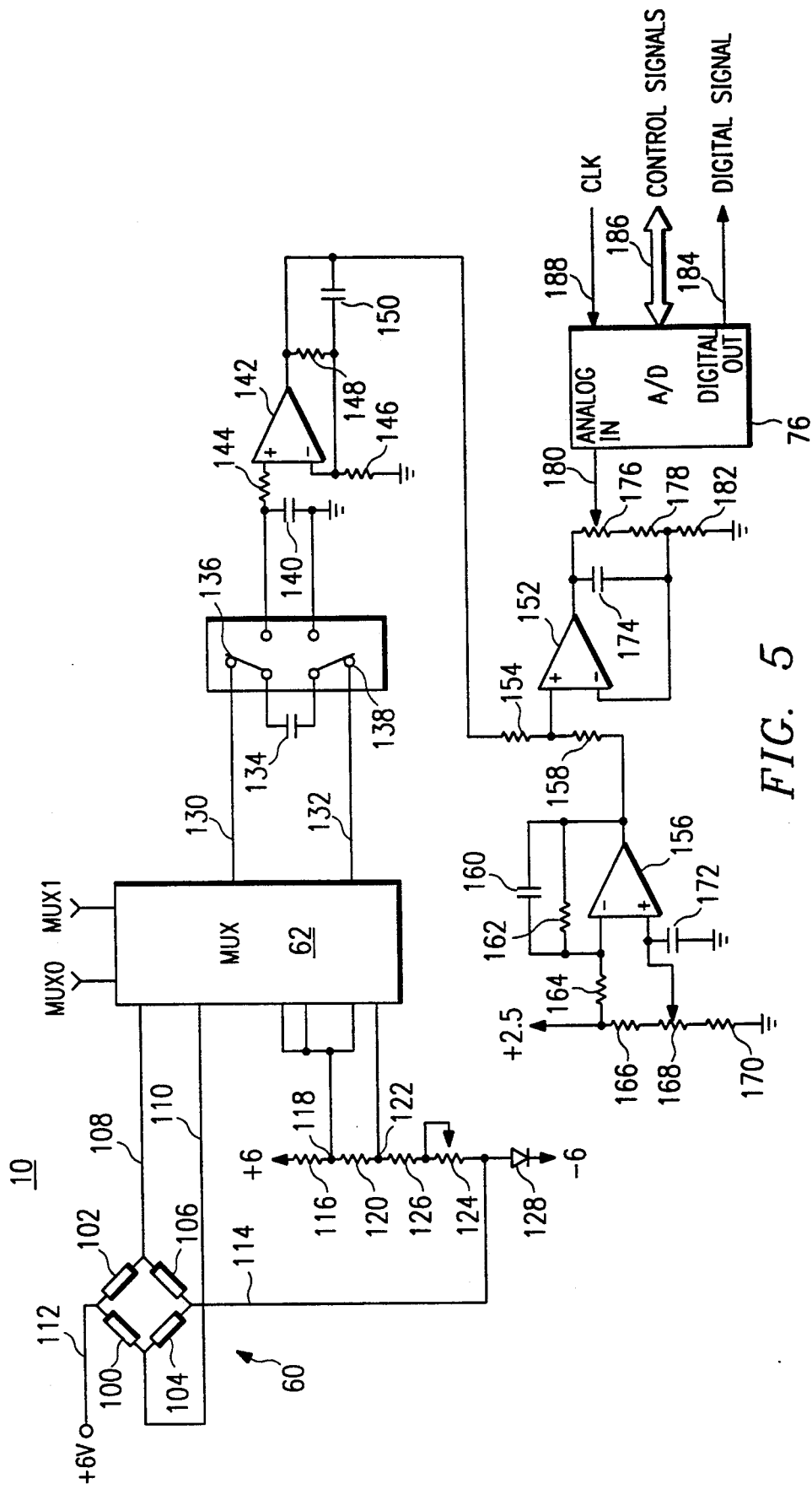
FIG. 5 is a schematic diagram of the preferred embodiment of an analog circuitry portion of the self-contained weighing system.

Referring to FIG. 5, where like numerals refer to like elements in FIG. 4, transducer 60 comprises strain gages 100 to 106 connected in an electrical bridge circuit which provide an analog load signal on lines 108 and 110 indicating the load applied on load cell 16. Excitation to the electrical bridge circuit is provided on lines 112 and 114 having positive six volts and approximately negative 5.4 volts, respectively. Transducer 60 compensates for variations in ambient temperature by incorporating materials in the electrical bridge circuit that effectively cancel the temperature effects. Such techniques for temperature compensation provide an accurate compensated load signal and are well known in the art.

The analog load signal on lines 108 and 110 from transducer 60 are connected to an input of analog MUX 62. The other inputs of analog MUX 62 are connected to a resistor circuit which provides differential ANALOG ZERO and ANALOG MAX voltages. The resistor circuit includes resistor 116 coupled between a positive six-volt source and a node 118. Node 118 is connected to a resistor 120 and three inputs of analog MUX 62. Resistor 120 is coupled to a node 122, which is also connected to an input of analog MUX 62. Node 122 is further coupled to a variable resistor 124 through a resistor 126. Variable resistor 124 is further coupled to a negative six-volt source through a diode 128. The anode of diode 128 is also connected to excitation line 114 of transducer 60. Constructed in this manner, the second set of inputs to analog MUX 62 is the voltage level at node 118, and the third set of inputs to analog MUX 62 receives the differential voltage across resistor 120. Note that the fourth set of inputs of analog MUX 62 is not used in this embodiment. Analog MUX 62 receives two control inputs MUXO and MUXI from microprocessor 66, which determine which set of inputs is to be provided at the output lines 130 and 132.

Output lines 130 and 132 of analog MUX 62 are coupled to switches 136 and 138. Switches 136 and 138 are capable of switching rapidly between a first position and a second position. In the first position, switches 136 and 138 connect lines 130 and 132 to a capacitor 134, while in the second position, the switches connect capacitor 134 in parallel with a capacitor 140. One terminal of capacitor 140 is connected to ground. Constructed in this fashion, one half of the charge accumulated on capacitor 134 is transferred to capacitor 140 each time switches 136 and 138 are moved to the second position, until approximately all of the charges on capacitor 134 are transferred to capacitor 140, where it becomes ground referenced.

Capacitor 140 is further coupled to a non-inverting input of an operational amplifier 142 through resistors 144. The inverting input of operational amplifier 142 is connected to ground through a resistor 146, and is further coupled to its output through a resistor 148 and a capacitor 150 connected in parallel. Preferably, operational amplifier 142 has a gain of approximately 12.5, but it is adjustable through changing the resistance values of resistors 146 and 148.

The output of operational amplifier 142 is coupled to a non-inverting input of a second operational amplifier 152, having a gain of approximately 4.8, through a resistor 154. The gain of operational amplifier 152 may be adjusted by varying the resistance values of resistors 178 and 182. A unity gain operational amplifier 156 is coupled to the non-inverting input of second operational amplifier 152 through a resistor 158. Operational amplifier 156 has a feedback circuit consisting of a capacitor 160 and a resistor 162 connected in parallel to its inverting input. A resistor 164 is connected between the inverting input of operational amplifier 156 and a positive 2.5-volt source (shown in FIG. 7). Also connected to the 2.5-volt source are three resistors 166, 168 and 170 connected in series to ground. Of these, resistor 168 is a variable resistor which is coupled to a non-inverting input of operational amplifier 156. The non-inverting input of operational amplifier 156 is also coupled to ground through a capacitor 172.

The output of operational amplifier 152 is coupled to its inverting input through a capacitor 174. Coupled in parallel to capacitor 174 are serially connected variable resistor 176 and resistor 178. Variable resistor 176 is also coupled to the input (ANALOG IN) of A/D converter 76 via line 180. A resistor 182 is connected in series between capacitor 174, series resistors 176, 178 and ground. A/D converter 76 is operable to receive the analog signal on line 180, convert the analog signal to a digital signal, and provide it as an output (DIGITAL OUT) on line 184 to microprocessor 66. In addition, A/D converter 76 receives and supplies a plurality of control signals from and to microprocessor 66 on lines 186. A clock signal CLK is provided as a synchronizing signal to A/D converter 76 on line 188, the generation of which is to be discussed below.

In FIG. 6, microprocessor 66 receives, on line 184, the digital signal, from A/D converter 76, indicative of the weight applied to load cell 16. A plurality of control signals, including SC1, SC2 and CAL on lines 190 to 194, is transmitted between A/D converter 76 and microprocessor 66. Signals SC1 and SC2 control the type of calibration to be performed by A/D converter 76 on an active edge of signal CAL. Other control signals may be transmitted between A/D converter 76 and microprocessor 66 as required, but will not be enumerated herein. A/D converter 76 also receives two voltage levels, positive 2.5 volts on line 196 and ground on line 198, as reference voltages during calibration. The functions of A/D converter 76 will be more apparent in the discussion below.

An oscillator buffer (not shown) internal to microprocessor 66 is coupled to a ceramic or crystal oscillating resonator 200 on lines 202 and 204. The resonator is preferably 1.8432 MHz and is coupled to ground between two capacitors 206 and 208. The output of oscillator buffer on line 202 is connected to a clock input 210 of a data flip-flop 212. A data input D of data flip-flop 212 is connected to its inverted output $\bar{Q}$ via line 214. A non-inverted output Q of data flip-flop 212 is connected to A/D converter 76 as a clock signal CLK on line 188. In effect, the frequency of resonator 200 is divided by two by data flip-flop 212, so that clock signal CLK has a frequency of 0.9216 MHz Microprocessor 66 is coupled to keyboard 42 having three keys in the form of switches 216, 218 and 220. Switches 216, 218 and 220 enable a user to reset system 10, to turn system 10 on and off, and to toggle between measurement units pounds and kilograms, respectively. Switch 218 is additionally connected via line 92 to transistor 88 (FIG. 4). Note that keyboard 42 may include other additional functions as deemed necessary without departing from the teachings of the present invention.

The discharged condition of battery 86 is monitored by comparator circuit 96, which includes operational amplifiers 222 and 224 coupled to battery 86 through a resistor network. Non-inverting inputs of operational amplifiers 222 and 224 are connected to an output of another operation amplifier 226. An inverting input of operational amplifier 226 is coupled to its output through a resistor 228. A non-inverting input of operational amplifier 226 is connected to a node 230, which is connected to resistors 232 and 234. Resistor 234 is connected to ground at the terminal not connected to node 230. Coupled in parallel with resistors 232 and 234 are a capacitor 236 and a Zener diode 238. The parallel resistors, capacitor 236 and Zener diode 238 are coupled to positive six volts through a resistor 240. A capacitor 242 is further connected between both non-inverting inputs of operational amplifiers 222 and 224 and ground.

The inverting inputs of operational amplifiers 222 and 224 are connected to two nodes between series connected resistors 244, 246, 248 and 250, which are coupled in that order between positive six volts and ground. The inverting input of operational amplifier 222 is connected to a node 252 between resistors 246 and 248, and the inverting input of operational amplifier 224 is connected to a node 254 between resistors 248 and 250. A capacitor 256 is coupled in parallel with resistors 246, 248 and 250. Resistor 244 is a variable resistor with its third terminal connected to positive six volts.

Operational amplifiers 222 and 224 provide two outputs, on lines 258 and 260, indicating two battery discharge conditions: RECHARGE and LOW BATTERY, respectively. Both signals are received by microprocessor 66. Signal LOW BATTERY indicates that the charge stored in battery 86 has fallen below a first predetermined level, preferably 11.4 volts. Signal RECHARGE indicates that battery 86 should be recharged immediately since the charge stored therein has fallen below a second predetermined level less than the first predetermined level, preferably 11.1 volts.

Microprocessor 66 is also adapted to receive dip switch 262 settings configured to indicate the weight capacity of the load cell. As described previously, in the instant embodiment load cell 16 may have weight capacities with maximum weight varying from, for example, five thousand pounds to two hundred thousand pounds. The weight capacity, as indicated by dip switches 262, allows microprocessor 66 to adjust the full range of the load signal to the full capacity of load cell 16.

Referring to FIG. 7, battery 86 is connected to an emitter of a transistor 270. A base of transistor 270 is coupled to its emitter through a resistor 272. The base of transistor 270 is further coupled to a drain of an n-channel MOSFET 274 through a resistor 276. An anode of a diode 278 is further connected to the drain of MOSFET 274 and is connected to ON/OFF switch 218 at its cathode. A source of MOSFET 274 is connected to ground, and a gate thereof is coupled to ground through a resistor 280. A signal ON ENABLE is transmitted on line 94 from microprocessor 66 and is received by the gate of MOSFET 274. Positive six volts and negative six volts are available at nodes 282 and 284, respectively. To provide the various voltage levels required to operate the analog and digital circuits in system 10, a power supply 286 and a precision voltage reference 288 are each coupled to node 282 to generate a five-volt voltage level and a 2.5-volt voltage level, respectively.

A virtual ground circuit 300 is coupled to battery 86 to establish a virtual ground voltage level for system 10. An inverting input of an operational amplifier 302 is coupled to positive six volts at node 282 through a resistor 304 and to negative six volts at node 284 through a resistor 306. A non-inverting input of operational amplifier 302 i coupled to ground through a resistor 308. The output of operational amplifier 302 is connected to the base of a transistor 310 through a resistor 312. The base of transistor 310 is further coupled to node 284 through a resistor 314. The emitter of transistor 310 is connected directly to node 284. The collector of transistor 310 is coupled to node 282 through a resistor 316, and is further coupled to a base of a transistor 318 through a resistor 320. The emitter of transistor 318 is connected to ground and the collector thereof is connected to node 284.

Figure 8:
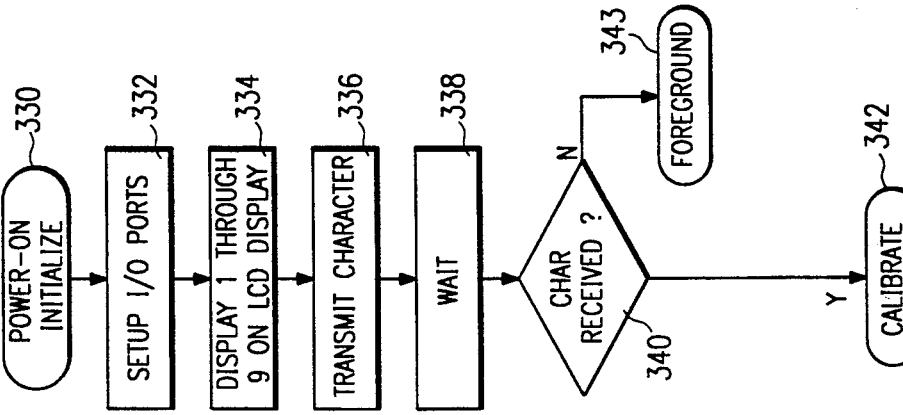
FIG. 8 a simplified flowchart of the preferred embodiment of a power-on and initialize routine.

In operation of the present invention, please refer to the flowcharts describing a program executed in microprocessor 66 shown in FIGS. 8 to 14. As self-contained weighing system 10 is turned on by depressing ON/OFF key 46 (FIG. 3), it closes switch 218 (FIG. 6) to ground and generates a low signal, which turns on transistor 270 (FIG. 7) and connects battery 86 to power supplies 286 and 288 supplying electrical power to the circuits of system 10. Microprocessor 66 is thus powered up, and generates the ON ENABLE signal. The ON ENABLE signal is received by MOSFET 274, turning it on. A current thus flows from the base of transistor 270 to the drain of MOSFET 274, which keeps transistor 270 on, even when ON/OFF key 46 is released. Referring to FIG. 8, a power-on initialize routine 330 is shown. After microprocessor 66 is powered on, the I/0 ports (not shown) for transmitting and receiving data from various points in system 10, such as display 38, keyboard 42, RS232C level shifter 82, A/D converter 82, and memory 78, are set up and initialized, as shown in block 332. Thereafter in block 334, microprocessor 66 tests LCD display 38 by transmitting numerals 111 ... 1, 222 ... 2, through 999 ... 9 to it, so that a human operator may visually check its operation. Next in block 336, a character is transmitted to portable terminal 84 through internal UART 80 and RS232C level shifter 82, and a predetermined amount of time is set to wait for a response from portable terminal 84 as shown in block 338. In block 340, it is determined whether the character transmitted is echoed back as an acknowledge from portable terminal 84. If so, portable terminal 84 is connected to system 10, and a calibrate routine 342 is executed; if not, the program proceeds to a foreground task 343, to be discussed below. Note that portable terminal 84 is used for calibrating system 10 during manufacturing, and that it is not used during actual weighing.

Figure 9:
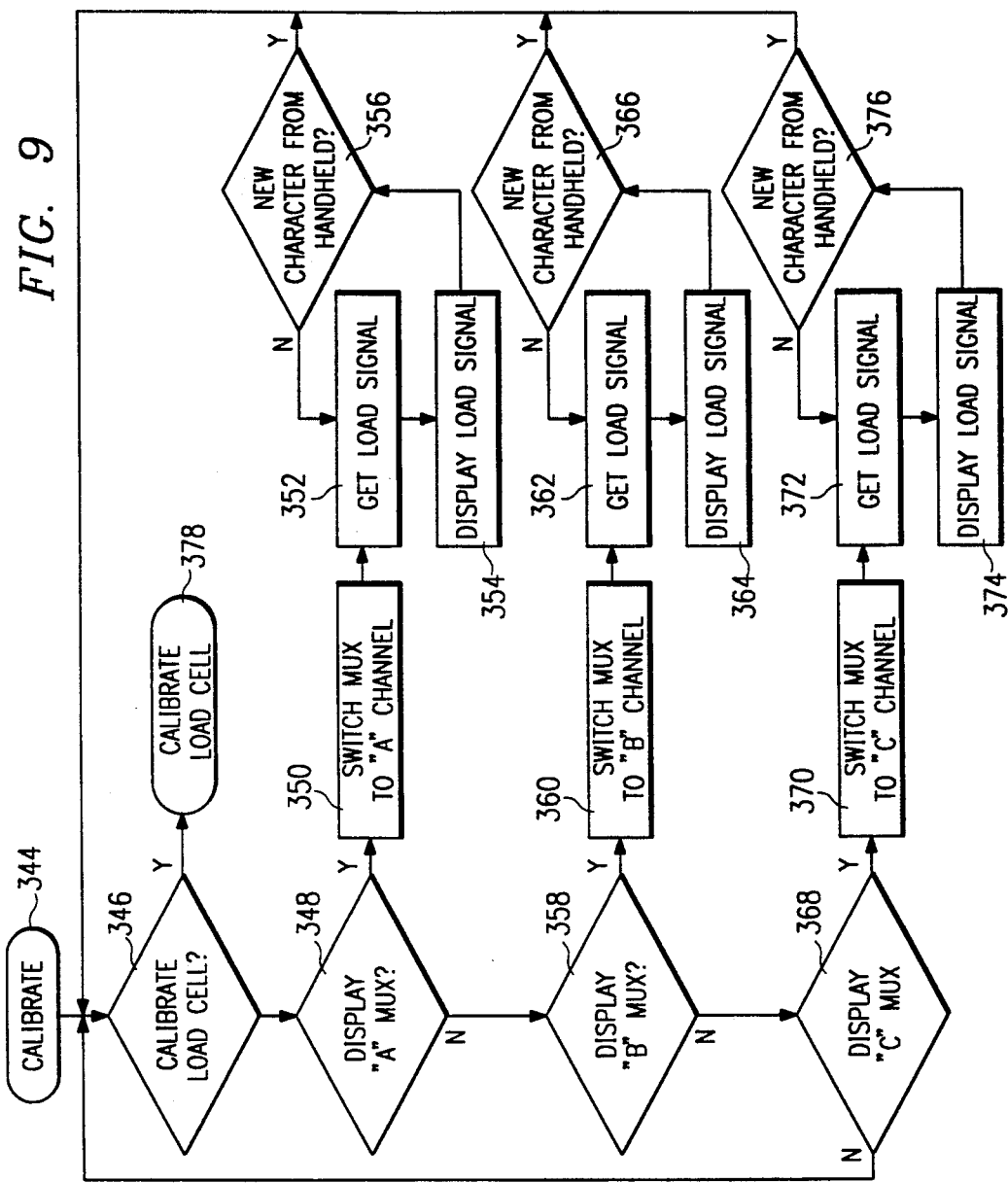
FIG. 9 is a simplified flowchart of a calibration routine in the preferred embodiment.

Proceeding to FIG. 9, calibrate routine begins in block 344, and a menu is displayed on the screen of portable terminal 84 prompting the user to select either load cell calibration or examination of the inputs of analog MUX 62. If the user chooses to examine the analog MUX inputs in response to block 346, a new menu is displayed providing choices A, B and C. Choices A, B and C represent the load signal from transducer 60, ANALOG ZERO or ANALOG MAX. In block 348, it is determined whether choice A has been chosen. If so, the program proceeds to block 350, where microprocessor 66 provides analog MUX 62 select signals MUX0=0 and MUX1=0 in order to select the actual load signal from transducer 60. In block 352, the load signal, after being processed by amplifier section 74 and converted to a digital signal by A/D converter 76, is received by microprocessor 66 and displayed as shown in block 354. Thereafter, in block 356 it is determined whether another character has been received from portable terminal 84, whereupon the program returns to block 346. Otherwise, the code represented in blocks 352 and 354 is executed until a new character is received.

Analog MUX input choices B and C are selected and executed in a similar fashion to choice A. If it is not choice C that is selected, but choice B as shown in block 358, then microprocessor 66 selects ANALOG ZERO by providing MUX0=0 and MUX1=1, as shown i block 360. As such, the voltage level at node 118 (FIG. 5) is produced at the output of analog MUX 62. In blocks 362 and 364, ANALOG ZERO is received by microprocessor 66 and displayed on portable terminal 84. Similarly, Choice C or ANALOG MAX is chosen and selected in blocks 368, 370, and the differential voltage between nodes 118 and 122 is converted into a digital signal and received by microprocessor 66. After a choice is made, it is determined whether a new character has been received from portable terminal 84, as shown in blocks 366 and 376.

Figure 10:
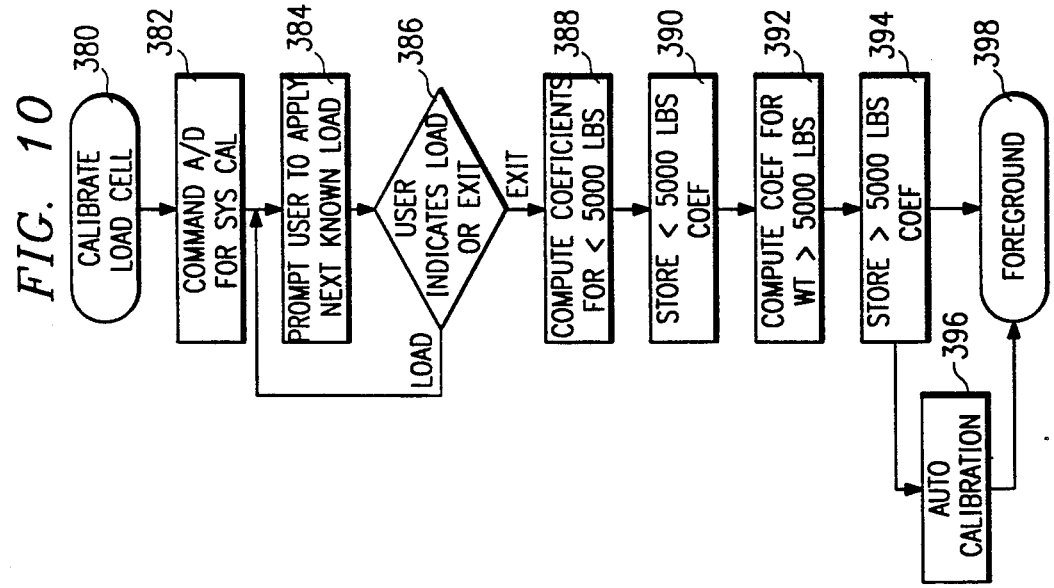
FIG. 10 is a simplified flowchart of a routine which calibrates the load cell of the weighing system in the preferred embodiment.

If, in block 346, the user chooses to calibrate the load cell, calibrate load cell routine 378 is executed. As shown in FIG. 10, calibrate load cell routine begins at block 380. In block 382, an A/D converter self calibration is performed. A/D converter 76 may be calibrated by providing voltage levels it may use as a zero scale point and a full scale point. A slope factor is calculated from the zero and full scale points, which represents the gain slope for the input to output transfer function of A/D converter 76. In self calibration, A/D converter 76 is commanded by microprocessor 66 via signals SC1, SC2 and CAL on lines 190 to 194 to use voltage values lines 196 and 198 (FIG. 6) for the full scale point and the zero scale point, respectively. The self calibration is done internally by A/D converter 76, and will not be discussed in detail herein.

Subsequent to A/D self calibration, the user is prompted in block 384 to apply a known load to load cell 16 and to enter the load weight value. The user may choose to do so or to exit, as shown in block 386. Typically, at least thirteen known loads are weighed in succession to collect thirteen sets of data consisting of a weight value and a weight signal as received by microprocessor 66. The known loads may be weighed in any order, but the data may be sorted by a sort task (not shown) and stored in memory 78 in ascending or descending order. After enough data are gathered, the user may choose to exit in block 386 and microprocessor 66 proceeds to compute coefficients of at least two polynomials which fit the data, as shown in blocks 388 through 394. Because of characteristics associated with the response of load cell 16 to different load weights in a broad range, the data for load weights below five thousand pounds are curve fitted to one polynomial, while data for load weights above five thousand pounds are curve fitted to a second polynomial. The coefficients are computed and stored in memory 78. The least square polynomial algorithm is based on a set of techniques collectively known as singular value decomposition. A book *Numerical Receipes in C, The Art of Scientific Computing* by Press et al. may be consulted for a discussion on this subject.

Subsequently, an auto calibration routine is called in block 396 and the program returns to foreground mode in block 398. The details of auto calibration will be discussed in conjunction with FIG. 12 below. It is important to note that the above routines related to portable terminal 84 are executed during calibration in the manufacturing process of the self-contained weighing system 10 and that system 10 is entirely self-contained during actual weighing.

Figure 12:
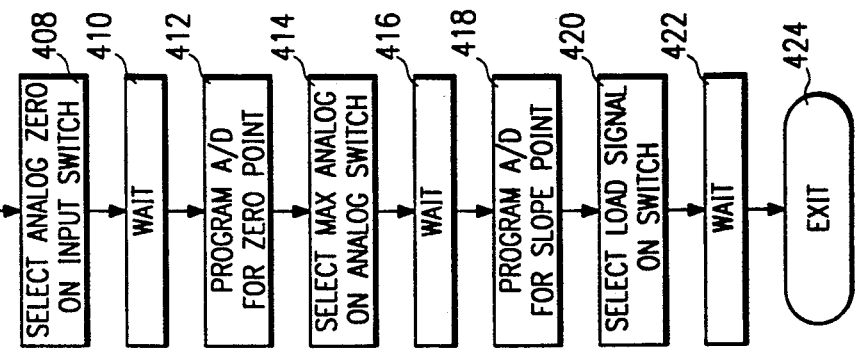
FIG. 12 is a simplified flowchart of an auto calibration routine in the preferred embodiment.
Figure 11:
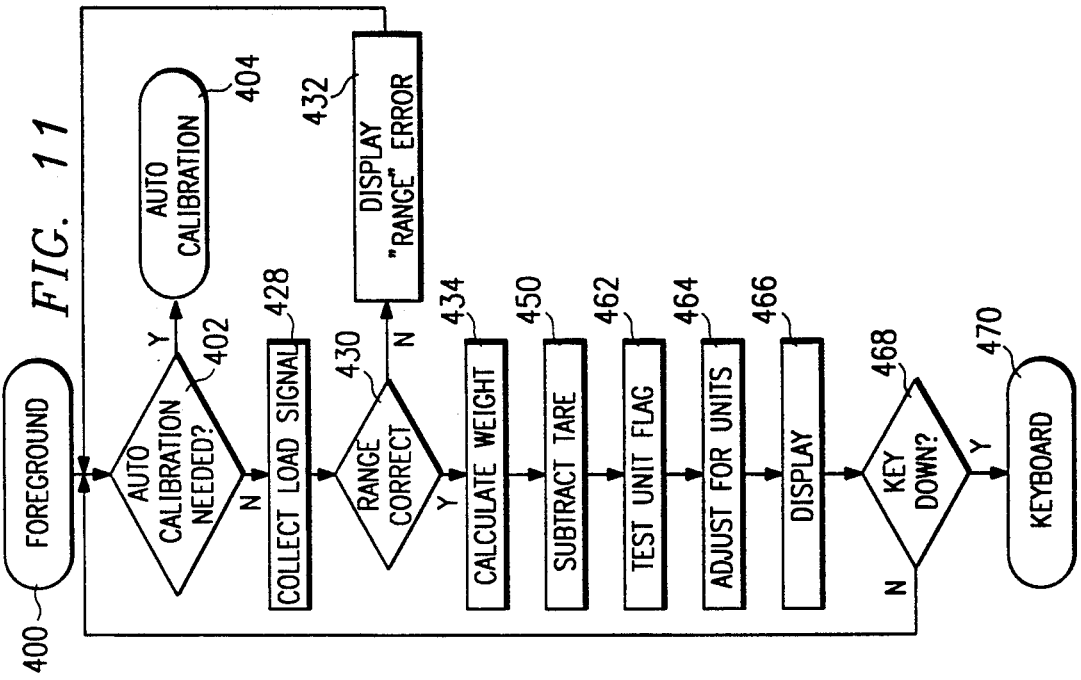
FIG. 11 is a simplified flowchart of tasks performed in the preferred embodiment of the present invention in a foreground mode.

Referring to FIG. 11, foreground task 400 weighs a load applied to load cell 16 (FIG. 2). The foreground task also determines whether auto calibration is required (block 402). System 10 preferably performs auto calibration every 9.5 minutes to ensure accuracy of the system. Auto calibration allows A/D converter 76 to compensate for system gain and offset errors. In auto calibration, instead of using a positive 2.5 volts level and ground as full and zero scale points, voltage values present on the ANALOG IN pin of A/D converter 76 is used for both scale points. If in auto calibration is needed, system 10 proceeds to auto calibration 404. Refer to FIG. 12, auto calibration begins in block 406 and begins by selecting ANALOG ZERO as the output of analog MUX 62 shown in block 408. In order for the ANALOG ZERO signal to stabilize and propagate properly to A/D converter 76, program execution waits approximately one second in block 410 before proceeding on to block 412. A/D converter 76 is commanded by microprocessor 66 via signals SC1, SC2 and CAL on lines 190 to 194 (FIG. 6) to receive the zero scale point. In block 414 and 416, ANALOG MAX is selected as the output of analog MUX 62 and allowed to propagate and stabilize. A/D converter 76 then receives the ANALOG MAX signal as the full scale point in block 418. From the zero and full scale point values, a slope factor representing the gain slope for the input to output transfer function of the converter is calculated. The slope factor is saved and later used to calculate the digital output of A/D converter 76 during measurement conversions.

In block 420 and 422, the load signal from transducer 60 is selected and provided as input to A/D converter 76, the program exits (block 424) and returns to the foreground task in FIG. 11. In block 428, microprocessor 66 collects the load signal from the output DIGITAL OUT of A/D converter 76. A range comparison of the digital load signal is made in block 430. If this digital load signal is all ones, then the load signal is out of range and is invalid. Similarly, if the digital load signal is all zeros, then the load signal is also out of range and is equally invalid. If the load signal is out of range, an appropriate message is displayed on LCD 38, shown in block 432, and program execution returns to block 402.

Figures 13, 14:
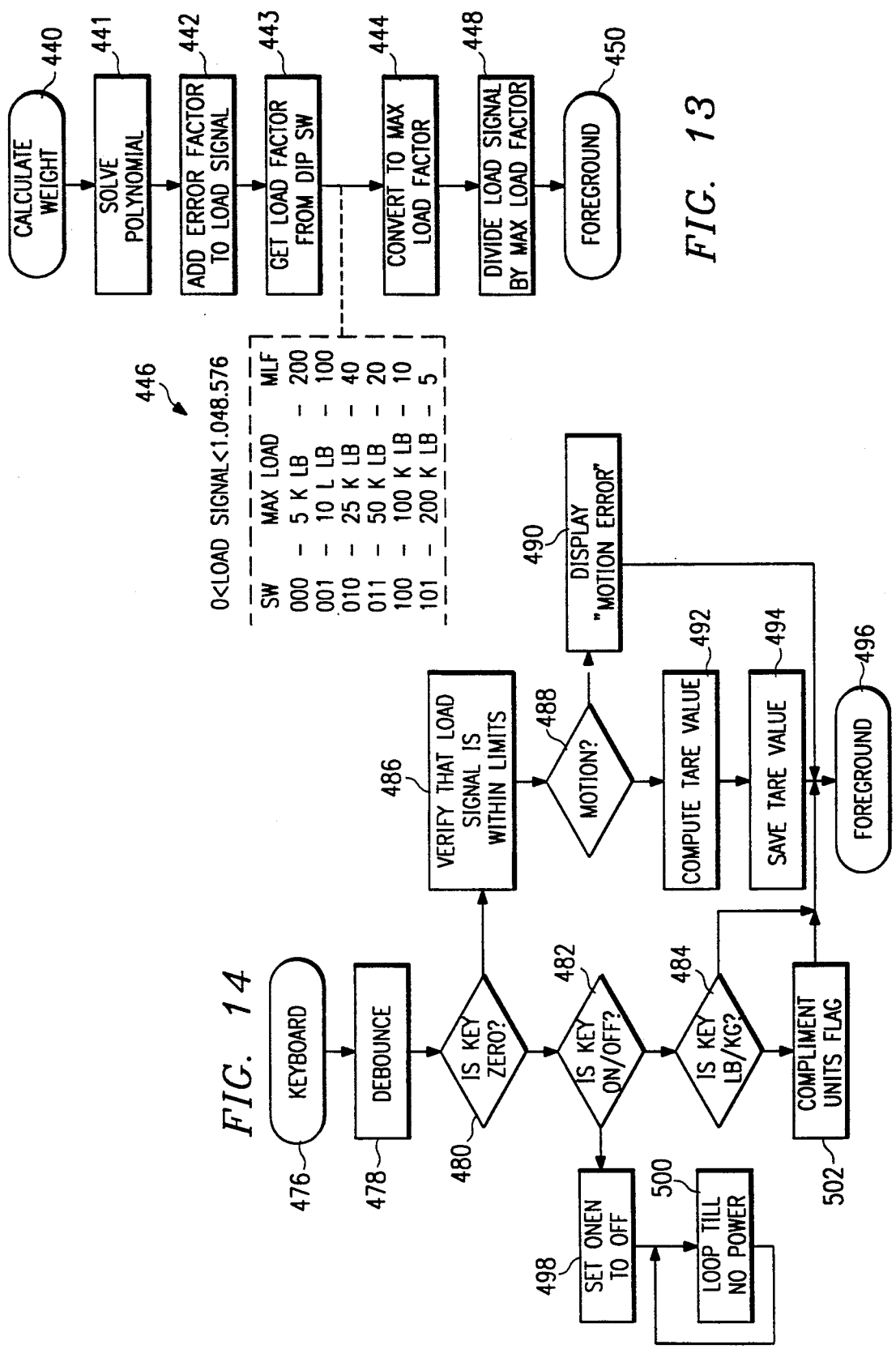
FIG. 13 is a simplified flowchart of a routine which calculates the weight being measured in the preferred embodiment of the present invention.
FIG. 14 is a simplified flowchart of a routine which monitors a keyboard of the weighing system in the preferred embodiment.

If the digital load signal is valid, then a weight value is calculated in block 434. A calculate weight routine is shown in FIG. 13 and begins in block 440. In block 441, the polynomial is solved by plugging in the signal load from A/D converter 76 and using the set of coefficients for either weight less than or greater than five thousand pounds. This yields an error factor which may be added to or subtracted from the load signal to generate an accurate load signal which has compensated for the nonlinearity of load cell 16 and circuit electronics, as shown in block 442. It is important to note that although the preferred embodiment of the present invention includes the least square polynomial algorithm, other mathematical techniques may also be employed, such as non-linear regression algorithms.

In block 443, the setting of dip switch 262 is received by microprocessor 66, and in block 444 the corresponding maximum load factor is obtained from a look-up table 446. Look up table 446 may be arranged as shown. The left most column of look-up table 446 is the logic levels of dip switch 262, each representing load cell types; the middle column represents the maximum load capacities for each load cell type; and the last column is the maximum load factor for each load cell type. The load signal value is divided by the maximum load factor to adjust the range of the load signal to the range of the weight capacity. The resultant number is the weight of the load being measured. The calculate weight routine ends here and returns to the foreground task in block 450.

After a weight value has been obtained from the calculate weight routine, a tare value, obtained during zeroing, which will be discussed below, is subtracted from the presently obtained weight value. The tare value represents any weight system 10 may have measured in addition to the load being applied. Such weight may be the weight of any extraneous objects, such as jigs used during measurement. After block 460, a unit flag is tested to determine whether a pound or a kilogram representation is desired on the display, and the weight value is adjusted accordingly, shown in blocks 462 and 464. The resultant weight value is displayed on LCD 38, as shown in block 466.

At this time, keys 44, 46 and 48 on keyboard 42 (FIG. 3) are monitored in block 468. If any one of keys 44 to 48 is depressed, a keyboard routine 470 is executed. The keyboard routine is shown in FIG. 14 and begins in block 476. The key depressed is first debounced in block 478. In blocks 480, 482 and 484 each key is tested to determine which key or keys are depressed. If the key depressed is zero key 46, then execution advances to block 486, where the load signal value is verified to be within predetermined limits. In block 488, motion caused by external forces are detected by comparing a previously obtained load signal value to a load signal value presently obtained. If the comparison yielded a difference of more than a predetermined setpoint, motion is detected, and a motion error message is displayed, as shown in block 490. If no motion is detected, the load signal is computed to obtain a tare value and saved, as shown in blocks 492 and 494. The program returns to foreground task in block 496.

If the key depressed is ON/OFF key 44, then microprocessor 66 proceeds to shut down the system by disabling the ON ENABLE signal to MOSFET 274 until there is no power, as shown in blocks 498 and 500. The self-contained weighing system 10 is then shut down.

If the key depressed is LB/KG key 46, the unit flag is simply toggled, where in one state the desired unit is pounds and in the other it is kilograms, as shown in block 502. The program proceeds to foreground task in block 496.

In summary, self-contained weighing system 10 may be operated without any external display screen, computing unit, or cable. The weight of an aircraft or heavy vehicle may be measured simply by placing one or more self-contained systems 10 at various weigh points of the load. The total weight of the load may then be computed by summing the weights displayed by system 10. System 10 provides a weight calculation based on a least square polynomial computed by curve fitting a data set of weight values and weight signals. This weight computation provides an accurate weight measurement. In addition, errors caused by temperature variation, motion, an zero drifting are eliminated.

Although the present invention has been described in detail, it should be understood that various changes, substitutions and alterations can be made hereto without departing from the spirit and scope of the invention as defined by the appended claims.

What is claimed is:

1. A method for determining weight measured by weighing apparatus comprising the steps of:
   providing an object of known weight within a range weighable by said apparatus;
   weighing said object of known weight by said apparatus;
   producing a weight signal correlative to the weight of said object of known weight;
   storing the weight of said object of known weight and said corresponding weight signal;
   repeating said above four steps with objects of differing known weights, the known weights of said objects spanning said range weighable by said apparatus;
   computing at least one least square polynomial fit to said stored weights and corresponding weight signals and producing at least one coefficient of said polynomial;
   storing said coefficient, whereby said above steps are preformed during manufacture;
   weighing an object of unknown weight by said weighing apparatus;
   producing a weight signal correlative to the weight of said object of unknown weight;
   storing said weight signal; and
   computing the weight of said object of unknown weight by solving the polynomial using said stored coefficient.

2. A method for determining weight measured by weighing apparatus comprising the steps of:
   providing an object of known weight within a range weighable by said apparatus;
   weighing said object of known weight by said apparatus;
   producing a weight signal correlative to the weight of said object;
   storing the weight of said object and said corresponding weight signal;
   repeating said above four steps with objects of differing known weights, the known weights of said objects spanning said range weighable by said apparatus;
   computing at least one least square polynomial fit to said stored weights and corresponding weight signals and producing at least one coefficient of said polynomial;

storing said coefficient, whereby said above steps are performed during manufacture;

computing at least two polynomial fits to said stored weights and corresponding weight signals and producing at least two sets of coefficients, whereby said first polynomial and corresponding first set of coefficients is for weights below a predetermined setpoint, and said second polynomial and corresponding second set of coefficients is for weights above a predetermined setpoint; and computing a weight of an object of unknown weight by solving one of said two polynomials to produce an error factor, and adding said error factor to said weight signal.

3. A method for determining weight measured by weighing apparatus comprising the steps of:

providing an object of known weight within a range weighable by said apparatus;

weighing said object of known weight by said apparatus;

producing a weight signal correlative to the weight of said object;

storing a weight signal correlative to the weight of said object;

repeating said above four steps with objects of differing known weights, the known weights of said objects spanning said range weighable by said apparatus;

computing at least one least square polynomial fit to said stored weights and corresponding weight signals and producing at least one coefficient of said polynomial;

storing said coefficient, whereby said above steps are performed during manufacture; and computing at least two polynomial fits to said stored weights and corresponding weight signals and producing at least two sets of coefficients, whereby said first polynomial and corresponding first set of coefficients is for weights below a predetermined setpoint, and said second polynomial and corresponding second set of coefficients is for weights above a predetermined setpoint, wherein said predetermined setpoint is five thousand pounds or its equivalent in other measurement units.

* * * * *

UNITED STATES PATENT AND TRADEMARK OFFICE
CERTIFICATE OF CORRECTION

PATENT NO. : 5,270,494
DATED      : December 14, 1993
INVENTOR(S) : Davis, et al.

It is certified that error appears in the above-identified patent and that said Letters Patent is hereby corrected as shown below:

Column 2, line 50, after "FIG. 8" insert -- is --.

Column 8, line 21, "302 i" should be --302 is --.

Column 14, line 3, after "storing" delete "a weight signal correlative"; and

Column 14, line 4, after "object", insert -- and said corresponding weight signal --.

Signed and Sealed this

Twentieth Day of December, 1994

BRUCE LEHMAN

Attest:

Attesting Officer

Commissioner of Patents and Trademarks